(12) United States Patent
Meitzner

(10) Patent No.: US 7,890,277 B2
(45) Date of Patent: Feb. 15, 2011

(54) METHOD FOR DETERMINATION OF STRAIN DISTRIBUTION IN COMPONENTS

(75) Inventor: Robert Meitzner, Karlsfeld (DE)

(73) Assignee: MTU Aero Engines GmbH, Munich (DE)

( * ) Notice: Subject to any disclaimer, the term of this patent is extended or adjusted under 35 U.S.C. 154(b) by 173 days.

(21) Appl. No.: 12/066,241

(22) PCT Filed: Aug. 31, 2006

(86) PCT No.: PCT/DE2006/001532

§ 371 (c)(1),
(2), (4) Date: Mar. 7, 2008

(87) PCT Pub. No.: WO2007/028360

PCT Pub. Date: Mar. 15, 2007

(65) Prior Publication Data

US 2008/0249722 A1      Oct. 9, 2008

(30) Foreign Application Priority Data

Sep. 9, 2005    (DE) ...................... 10 2005 042 820

(51) Int. Cl.
*G01L 1/00* (2006.01)
(52) U.S. Cl. ...................................... 702/56
(58) Field of Classification Search ............ 702/56
See application file for complete search history.

(56) References Cited

U.S. PATENT DOCUMENTS 4,969,106 A      11/1990    Vogel et al.

OTHER PUBLICATIONS

L. Mallet, et al., "Structural health monitoring using scanning laser vibrometry: II. Lamb waves for damage detection", Smart Materials and Structures, Apr. 2, 2004, pp. 261-269, IOP Publishing, UK.

Shen-En Chen, et al., "Damage detection using scanning laser vibrometer", Proceedings of the SPIE-The International Society for Optical Engineering, 1998, pp. 473-484, vol. 3411.

Shen-En Chen, et al., "A novel damage detection technique using scanning laser vibrometry and a strain energy distribution method", Materials Evaluation, American Soc. Nondestructive Test, Dec. 2000, pp. 1389-1394.

*Primary Examiner*—Tung S Lau
(74) *Attorney, Agent, or Firm*—Crowell & Moring LLP

(57) ABSTRACT

A method for determination of strain distribution in components, in particular in gas turbine components, is disclosed. In an embodiment, the method includes: a) vibrational excitation of the component and measured recording of a vibrational amplitude distribution of the component for a number of measured points by means of a vibrometer, each measuring point being determined by three coordinates and the measured vibrational amplitude distribution of each measuring point being a vectorial parameter; b) smoothing of the vibrational amplitude distribution recorded by measurement for each measuring point; c) definition of polygonal elements, wherein each measuring point forms a corner of at least one element; d) calculation of a tensor strain condition for each of the polygonal elements from the tensor vibrational amplitude distributions present in the corners of the elements; and e) calculation of the strain distribution in the corners of the elements from the strain conditions of the elements.

10 Claims, No Drawings

METHOD FOR DETERMINATION OF STRAIN DISTRIBUTION IN COMPONENTS

This application claims the priority of International Application No. PCT/DE2006/001532, filed Aug. 31, 2006, and German Patent Document No. 10 2005 042 820.7, filed Sep. 9, 2005, the disclosures of which are expressly incorporated by reference herein.

BACKGROUND AND SUMMARY OF THE INVENTION

The invention relates to a method for determination of strain distribution in components, in particular in gas turbine components.

If a strain distribution is supposed to be determined for a component, the procedure for doing so is either purely experimental or purely analytical according to the prior art. Using strain gauges that are positioned on the component and provide measured values about the strain distribution during vibrational excitation of the component is cited as an experimental procedure known from the prior art for determining the strain distribution of a component. However, these types of strain gauges can provide only a few local measured values for strain distribution of a component. Reference is made to the finite-element method as an analytical procedure known from the prior art for determining the strain distribution of a component. The finite-element method represents a purely mathematical determination of the strain distribution and does not take actual component geometries into consideration.

Starting herefrom, the present invention is based on the objective of creating a novel method for determination of the strain distribution in components, in particular in gas turbine components.

According to the invention the method is comprised of at least the following steps: a) production of a component, the strain distribution of which is to be determined; b) vibrational excitation of the component and measured recording of a vibrational amplitude distribution of the component for a number of measured points by means of a vibrometer, each measuring point being determined by three coordinates and the measured vibrational amplitude distribution of each measuring point being a vectorial parameter; c) smoothing of the vibrational amplitude distribution recorded by measurement for each measuring point; d) definition of polygonal elements, wherein each measuring point forms a corner of at least one element; e) calculation of a tensor strain condition for each of the polygonal elements from the vectorial vibrational amplitude distributions present in the corners of the elements and f) calculation of the strain distribution in the corners of the elements from the strain conditions of the elements.

The inventive method for determination of the strain distribution of a component represents a combination of experimental and analytical procedures. A vibrometer is used to measure the vibrational amplitude distributions on an actual component and consequently taking the actual component geometry into consideration, preferably for different modes of the component. Then analytical calculation is used to determine the strain distribution of the component from these experimental measuring data in the form of a tensor, in particular vectorial, strain condition. This represents a completely new procedure for determining the strain distribution in components.

According to an advantageous development of the invention, the measuring points in component regions with higher strain gradients are distributed over the component at a smaller distance than in component regions with lower strain gradients, wherein, to do so, the distribution of the measuring points over the component is performed iteratively.

The smoothing of the vibrational amplitude distribution recorded by measurement for each measuring point is preferably performed with the aid of cubic spline smoothing.

According to another advantageous development of the invention, for the calculation of the strain distribution, the tensor strain conditions of the elements, which are present in a local coordinate system of the respective element, are converted by a transformation on the main axes of the local coordinate system of the respective element to scalar main strains, wherein, in addition, to calculate the strain distribution for the corners of the elements, the scalar main strains in the respective corners are averaged, wherein a scalar strain distribution for the corners of the elements is produced as the result. Alternatively, for the calculation of the strain distribution, the tensor strain conditions of the elements, which are present in a local coordinate system of the respective element, are transformed to a global coordinate system, wherein, in addition, to calculate the strain distribution for the corners of the elements, the transformed, tensor strain conditions in the respective corners are averaged, wherein a tensor strain distribution for the corners of the elements is produced as the result.

Preferred developments of the invention are yielded from the subsequent description. Without being limited hereto, exemplary embodiments of the invention are explained in greater detail in the following.

DETAILED DESCRIPTION OF EXEMPLARY EMBODIMENTS

The present invention relates to a method for determination of the strain distribution in components, in particular gas turbine components, wherein the invention combines experimental procedural steps with analytic procedural steps. This makes it possible to determine an exact strain distribution taking actual component geometries into consideration.

In a first step of the inventive method, a component whose strain distribution is to be determined is made available.

In a second step of the inventive method, the component that has been made available is excited to vibrate, wherein the vibrational amplitude distribution for a number of measured points of the component are measured by means of a vibrometer, namely a 3D scanning vibrometer, and then determined experimentally. The vibrational amplitude distribution measured for each measuring point of the component is a tensor parameter, which is preferably measured or determined for different modes of the component.

When experimentally determining the vibrational amplitude distribution for the measuring points of the component, the procedure can be distributing the measuring points equidistantly over the component. Alternatively, it is also possible to distribute the measuring points in component regions with higher strain gradients over the component at a smaller distance than in component regions with lower strain gradients, wherein, to do so, the distribution of the measuring points over the component is then performed preferably iteratively. In any case, the measuring points are determined by three coordinates, wherein the vibrational amplitude distribution measured for each three-dimensional measuring point is also a three-dimensional tensor parameter.

It is noted, in connection with the experimental measured recording of the vibrational amplitude distribution for each measuring point of the component by means of a 3D scanning vibrometer, that the 3D scanning vibrometer should be arranged in such a way that particularly the so-called in-plane components as well as the so-called out-plane components of the vibrational amplitude distribution can be broken down well. The dynamic range of the 3D scanning vibrometer should be utilized as completely as possible and, if need be, the sensitivity range of the 3D scanning vibrometer is adapted automatically to the local vibrations in the respective measuring points.

After the experimental determination of the vibrational amplitude distribution in the measuring points of the component, the tensor vibrational amplitude distributions recorded by measurement are smoothed in a third step of the inventive method. The smoothing is accomplished in this case with the aid of a so-called spline smoothing method, preferably with the aid of cubic spline smoothing.

In a further step of the inventive method, polygonal elements, preferably triangular elements are defined using the measuring points. In this connection, each measuring point forms a corner of at least one such triangular element.

Following the definition of the triangular elements, a tensor strain condition is calculated for each of the triangular elements from the smoothed, vectorial vibrational amplitude distributions, which are present in the corners of the triangular elements. This tensor strain condition is determined in the local coordinate system of the respective triangular element.

Following the calculation of the tensor strain conditions present in the location coordinate systems for the triangular elements, the strain distribution in the corners of the triangular elements is calculated from the strain conditions.

The procedure for this according to a preferred embodiment of the present invention is that first the tensor strain conditions of the triangular elements, which are present in the respective local coordinate system of the respective triangular element, are converted by a transformation on the main axes of the respective local coordinate system to scalar main strains. In this connection, a maximum main strain and a minimum main strain are determined for each triangular element, wherein the main strains are scalar quantities. Following this, a scalar strain distribution for the corners of the triangular elements and thus for all measuring points of the component is determined from these scalar main strains of the triangular elements, wherein, to do this, the scalar main strains of the triangular elements (namely the maximum main strains on the one hand and the minimum main strains on the other) are averaged for each corner and thus for each measuring point. These mains strains are formed using the respective corner or are those that border or abut the respective corner.

Accordingly, an averaged maximum main strain as well as an averaged minimum main strain is calculated for each corner or measuring point, whereby these averaged scalar main strains determine the scalar strain distribution for the component. Because of the transformation of the tensor strain conditions present in the local coordinate systems of the respective triangular elements to scalar main strains, the computational effort for determining or calculating the strain distribution can be minimized.

According to an alternative of the invention, for the calculation of the strain distribution, the tensor strain conditions of the elements, which are present in the respective local coordinate system of the respective triangular elements, are transformed to a global coordinate system. After the transformation of all tensor strain conditions of the triangular elements to the global coordinate system, then, to calculate a tensor strain distribution for the corners of the triangular elements or for the measuring points of the component, the transformed, tensor strain conditions in the respective corners are averaged. In each corner or measuring point, the tensor strain conditions of the triangular elements, which are determined by the respective corner or measuring point or abut the respective corner, are averaged in this connection.

It is pointed out that the strain distribution determined with the aid of the inventive method can also be converted to a stress distribution. To do this, the tensor strain distribution is merely offset with the stress-strain tensor.

The invention claimed is:

1. A method for determination of strain distribution in components, in particular in gas turbine components, comprising the sequential steps of:
   a) production of a component, the strain distribution of which is to be determined;
   b) vibrational excitation of the component and measured recording of a vibrational amplitude distribution of the component for a number of measured points by means of a vibrometer, each measuring point being determined by three coordinates and the measured vibrational amplitude distribution of each measuring point being a vectorial parameter;
   c) smoothing of the vibrational amplitude distribution recorded by measurement for each measuring point;
   d) definition of polygonal elements, wherein each measuring point forms a corner of at least one element;
   e) calculation of a tensor strain condition for each of the polygonal elements from tensor vibrational amplitude distributions present in the corners of the elements by a computer; and
   f) calculation of the strain distribution in the corners of the elements from the strain conditions of the elements by the computer.

2. The method according to claim 1, wherein in step b) the vectorial vibrational amplitude distribution is determined in the measuring points with aid of a 3D scanning vibrometer.

3. The method according to claim 1, wherein in step b) the measuring points are distributed equidistantly over the component.

4. The method according to claim 1, wherein in step b) the measuring points in component regions with higher strain gradients are distributed over the component at a smaller distance than in component regions with lower strain gradients, wherein, to do so, a distribution of the measuring points over the component is performed iteratively.

5. The method according to claim 1, wherein in step c) the smoothing of the vibrational amplitude distribution recorded by measurement for each measuring point is performed with aid of cubic spline smoothing.

6. The method according to claim 1, wherein in step d) triangular elements are defined.

7. The method according to claim 1, wherein in step e) the tensor strain condition of each element is calculated in a local coordinate system of the respective element.

8. The method according to claim 1, wherein in step f) for the calculation of the strain distribution, the tensor strain conditions of the elements, which are present in a local coordinate system of the respective element, are converted by a transformation on main axes of the local coordinate system of the respective element to scalar main strains, and that, in addition, to calculate the strain distribution for the corners of the elements, scalar main strains in the respective corners are averaged, wherein a scalar strain distribution for the corners of the elements is produced as a result.

9. The method according to claim 1, wherein in step f) for the calculation of the strain distribution, the tensor strain conditions of the elements, which are present in a local coordinate system of the respective element, are transformed to a global coordinate system, and that, in addition, to calculate the strain distribution for the corners of the elements, the transformed, tensor strain conditions in the respective corners are averaged, wherein a tensor strain distribution for the corners of the elements is produced as a result.

10. A method for determination of a strain distribution in a component, comprising the sequential steps of:
   a) vibrational excitation of the component and measuring of a vibrational amplitude distribution of the component for a number of measuring points by a vibrometer, wherein each measuring point is determined by three coordinates and wherein the measured vibrational amplitude distribution of each measuring point is a vectorial parameter;
   b) smoothing of the measured vibrational amplitude distribution for each measuring point;
   c) defining polygonal elements, wherein each measuring point forms a corner of at least one polygonal element;
   d) calculating a tensor strain condition for each of the polygonal elements from the smoothed vibrational amplitude distributions of the corners of the polygonal elements by a computer; and
   e) calculating the strain distribution in the component from the tensor strain conditions of the polygonal elements by the computer.

\* \* \* \* \*